A. P. GERALD.
GASKET SEAT CLEANER.
APPLICATION FILED MAR. 5, 1913.
1,154,757.
Patented Sept. 28, 1915.
2 SHEETS—SHEET 1.
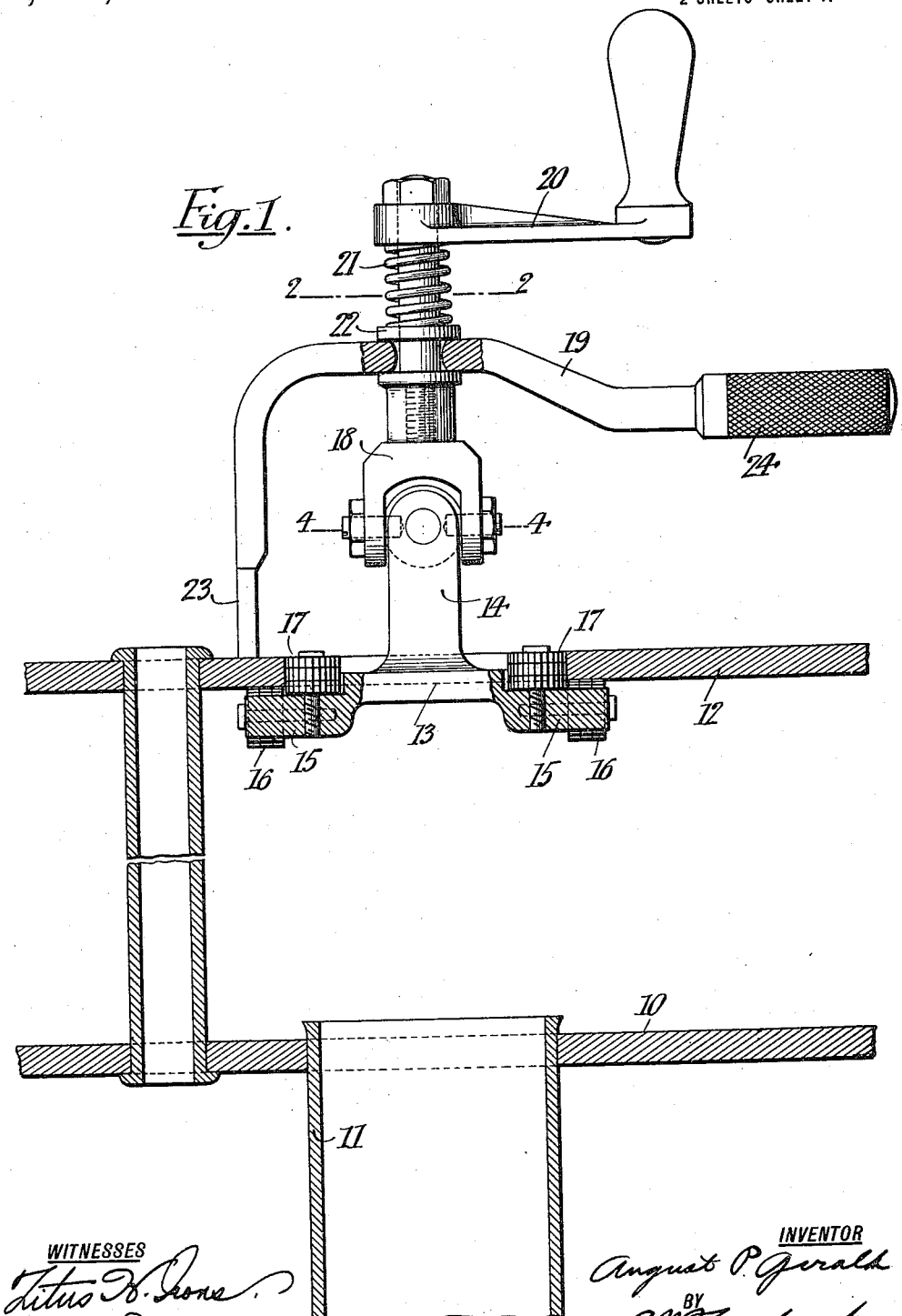

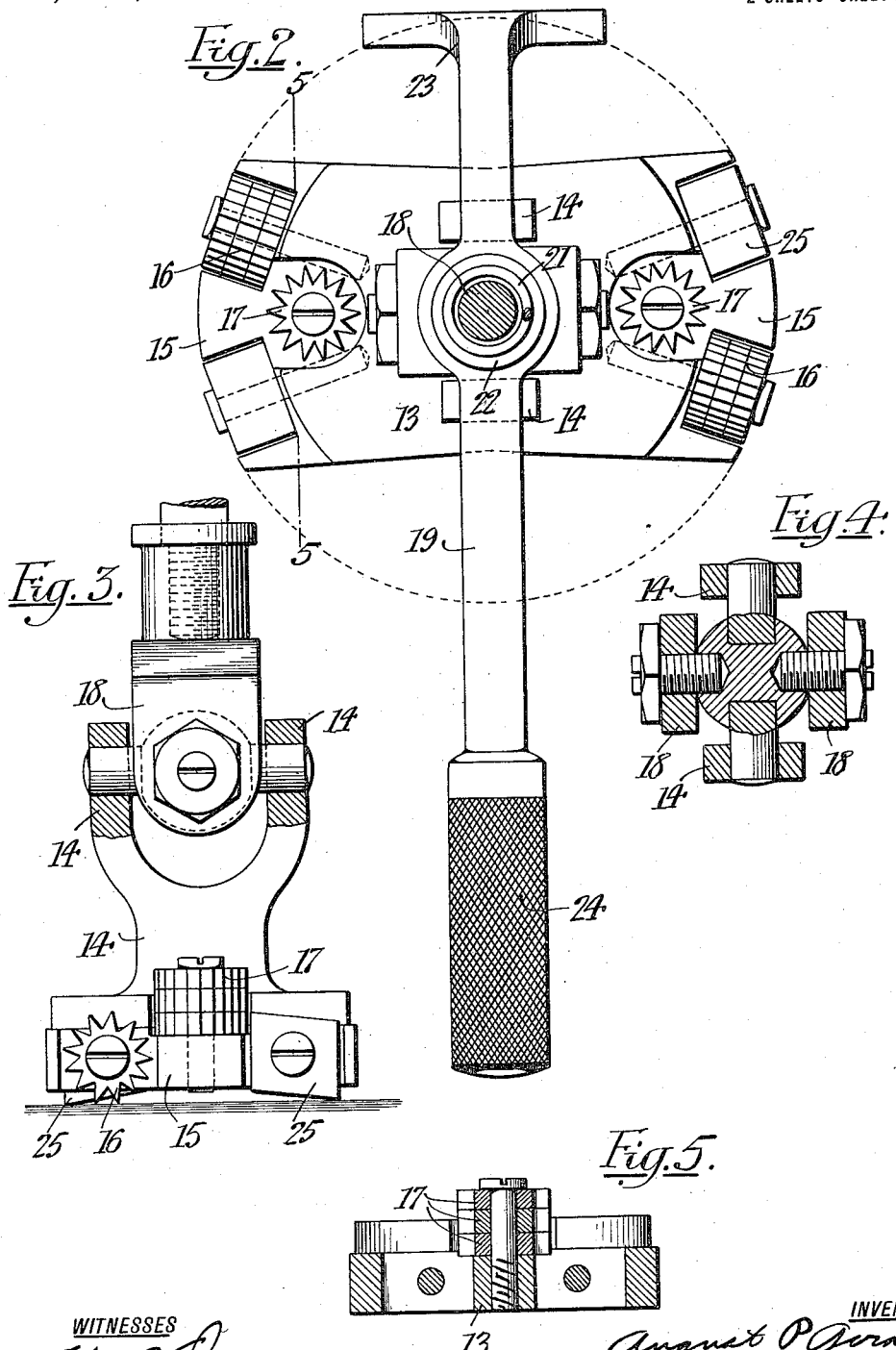

UNITED STATES PATENT OFFICE.

AUGUST P. GERALD, OF JERSEY CITY, NEW JERSEY.

GASKET-SEAT CLEANER.

1,154,757.  Specification of Letters Patent.  Patented Sept. 28, 1915.

Application filed March 5, 1913. Serial No. 752,049.

*To all whom it may concern:*

Be it known that I, AUGUST P. GERALD, a citizen of the United States, and a resident of Jersey City, in the county of Hudson and State of New Jersey, have invented a new and Improved Gasket-Seat Cleaner, of which the following is a full, clear, and exact description.

My present invention has for its general object to facilitate the removal of old gaskets or packings or the parts thereof which may adhere to the seat, and the cleaning of said seats preparatory to the reassembling of the parts with new gaskets.

Although different specific constructions embodying my invention may be utilized for the cleaning of valve seats and various other annular surfaces, the particular embodiment hereinafter described more in detail is specially designed for use in connection with certain types of water-tube boilers. One well-known type has a head spaced from the ends of the tubes and provided with openings opposite each tube and normally closed and sealed by a cap and gasket. Each time the tubes are cleaned all of the caps have to be removed and portions of the gaskets often adhere to the gasket seats upon the inner surface of said head. As access cannot readily be gained to the inner surface of said head except through the openings, it is usually a long and tedious task to clean all of these gasket seats preparatory to the replacing of the caps with new gaskets.

My improved device in its preferred construction includes a head adapted to be inserted through the opening and presenting one or more cutting tools which may serve either to cut up the remaining portions of the gasket and thus facilitate their removal, or may act to scrape away the fragments of gasket and thus clean the seat. The head is preferably so supported that it may be very easily and rapidly rotated and is also preferably so mounted as to resiliently hold the cutting or scraping elements against the seat with any desired pressure, which may be varied according to the character of the gasket, its seat, or the tenacity with which the gasket portions adhere to the seat. By connecting the cutter or scraper-bearing head to the driving means by a universal joint, the said driving means may be conveniently mounted upon a support movable toward and from the outer surface of the head and the necessity for the accurate positioning of the support during the adjustment may be avoided. By resiliently connecting the driving means to the support, the tension of the cutters or scrapers against the seat may be varied by an outward swinging movement of said support.

Reference is to be had to the accompanying drawings, forming a part of this specification, in which similar characters of reference indicate corresponding parts in all the views, and in which—

Figure 1 is a section through a portion of a water tube boiler illustrating my device properly positioned for use, a portion of said device being also shown in section; Fig. 2 is a plan view of said device but provided with scrapers, a portion being shown in section; Fig. 3 is an end view of the cutter-bearing head and connected parts, taken at right angles to the plane of Fig. 1; Fig. 4 is a transverse section on the line 4—4 of Fig. 1, and Fig. 5 is a transverse section on the line 5—5 of Fig. 2.

As I have previously stated, my device may be used for cleaning various forms of annular surfaces and the details and arrangements of parts may be varied to adapt the device to the particular use for which it is to be employed. The specific embodiment of the device illustraed is especially designed for cleaning the gasket seats in the Heine, Star, or similar type of boilers. I have illustrated a portion of a boiler having a head 10, open-ended water tubes 11, and an outer head or end wall 12. This outer head or end wall has a series of openings therein, one opposite each tube, and said openings are normally closed by caps not shown. The caps ordinarily have an annular flange adjacent the inner surface of the head around the openings and spaced therefrom by a gasket. Suitable clamping or retaining mechanism upon the outer surface of the head is usually employed to draw the cap outwardly to compress the gasket and seal the opening water tight.

My improved device is illustrated as having a head portion 13 of a length somewhat greater than the diameter of the hole in connection with which it is to be used, and of such a width that it may be readily inserted through the opening by a tilting of the head. The head has an outwardly-projecting central shank 14, either integral therewith or rigidly secured thereto and by means of which the head may be held in position and rotated about an axis extending approximately through the center of the opening. The end portions 15 of the head carry a plurality of cutting or cleaning members which act against the inner surface of the boiler head 12 in the vicinity of the hole, or, in other words, against the gasket seat. These members are illustrated as star wheels 16 mounted to rotate about axes substantially radial in respect to the shank 14 and all in a plane substantially at right angles thereto. The star wheels are so mounted that their surfaces project beyond the plane of the surface of the head, so that when the head is drawn into place the star wheels will contact with the boiler head, but the head of the tool will be spaced from the latter, Preferably, each star wheel is made up of a plurality of sections mounted on the same axis and capable of an independent rotation so that those which are farthest from the shank 14, which constitutes the axis of rotation of the head, may rotate about their own axes at a greater rate than the sections nearer to said shank and traveling in the shorter path. The star wheels may be of any suitable type of construction which is employed for cleaning boiler tubes or removing incrustations or deposits from surfaces and may be replaced by any other suitable equivalent tool.

In addition to the cutters 16, which act against the inner surface of the boiler head, I preferably provide a second set of cutter members mounted upon the outer surface of the head to rotate about axes substantially parallel to the axis of rotation of the head and operating against the edge of the metal of the boiler head within the opening. These should be mounted so as to properly engage when the tool is brought into position. With the head provided with the two sets of cutters 16 and 17, the rotation of the head about its own axis will carry the cutters over the gasket seat upon the inner surface of the boiler head and against the periphery of the opening through the boiler head so as to effectively clean both surfaces.

The shank 14 is preferably connected by a universal joint to a rotatable driving member 18 and the latter is mounted in a suitable support 19. Beyond the support the driving member 18 is provided with any suitable means for accomplishing the rotation of the member 18 and the head 13, as for instance a handle 20, and both the head and the shank member 18 are preferably slidable in respect to the support 19, and normally drawn outwardly by a suitable spring 21, which may operate as illustrated between the handle 20 and a loose washer 22 on the shaft. The member 18 may have a shoulder opposite to the washer so as to limit the outward movement.

The support 19 may be of any suitable character so as to properly hold the parts in position, but a convenient and, in fact, very efficient form of support, is the lever illustrated. This lever has one end broadened out to form a base 23 which will serve as a fulcrum when applied against the outer surface of the boiler head, and which is of sufficient width so that it will not readily tilt save in one direction. At the opposite end of the lever is a suitable handle 24, which may be held in one hand while the crank 20 is turned with the other. By pressing outwardly on the handle and away from the boiler head, the tension on the spring 21 may be increased so that the cutters of the head will press against the surface to be operated upon with the desired force dependent upon the character of the material to be removed from the surface and the tenacity with which it adheres. After the cleaning operation is completed, an inward movement of the handle 20 will carry the tool in through the opening so as to permit the tilting of the head and the removal out through the opening.

It will be noted that the opening through the support 19 is slightly enlarged toward each end, or, in other words, is so formed that the driving member which is rotatably mounted therein may be tilted to a considerable extent without interfering with the free rotation. This permits the support to swing about the base 23 as a fulcrum to vary the tension of the spring 21. If such tilting is greater than can be taken care of by the forming of the opening as illustrated in Fig. 1, the universal joint will permit the proper rotation of the head even though the driving section is at a considerable angle. By this universal joint and the loose connection beneath the washer 21, the accurate positioning of the base 23 of the lever becomes unimportant, and thus greater speed may be attained in the insertion of the tool and cleaning of the gasket seat.

The form of the head and support may be varied within the scope of my invention so as to facilitate the cleaning of the gasket seats on the caps which fit in the openings of the boiler head.

As previously stated, the character of the cutting tool may be varied according to the character of the material to be cut. I may use in addition to the star wheels illustrated, a shaving, scraping or cutting tool 25, which merely presents a sharp edge acting as a scraper against the surface to be cleaned.

Having thus described my invention, I claim as new and desire to secure by Letters Patent:

1. An apparatus of the class described including a head adapted to be positioned adjacent to one surface of a wall, means upon the opposite surface of the wall for rotating said head, and means for resiliently pressing said head toward said wall.

2. An apparatus of the class described, including a cutter head adapted to be positioned adjacent one surface of a wall, a standard adapted to project through said wall, and a support in engagement with the opposite surface of said wall and resiliently connected to said standard.

3. An apparatus of the class described, including a cutter head adapted to be positioned adjacent one surface of a wall, a standard adapted to project through said wall, a support in engagement with the opposite surface of said wall and connected to said standard, and means including a universal joint for rotating said standard and said head.

4. An apparatus of the class described including a lever having one end adapted to serve as a fulcrum and the opposite end as a handle, a shaft rotatably mounted in said lever, a head having a standard connected to said shaft, and cutters upon the face of said head toward said lever.

5. An apparatus of the class described including a lever having one end adapted to serve as a fulcrum and the opposite end as a handle, a shaft rotatably and tiltably mounted in said lever, a head having a standard connected to said shaft, and cutters upon the face of said head toward said lever.

6. An apparatus of the class described including a lever having one end adapted to serve as a fulcrum and the opposite end as a handle, a shaft rotatably mounted in said lever, a head having a standard connected to said shaft, by a universal joint, and cutters upon the face of said head toward said lever.

7. An apparatus of the class described including a lever having one end adapted to serve as a fulcrum and the opposite end as a handle, a shaft rotatably and tiltably mounted in said lever, a head having a standard connected to said shaft by a universal joint, and cutters upon the face of said head toward said lever.

8. An apparatus of the class described including a head, a star wheel cutter mounted thereon, a scraper mounted on said head adjacent said star wheel cutter, and means for rotating said head to pass said star wheel cutter and said scraper in succession over the surface to be operated upon.

9. An apparatus of the class described including a head, a plurality of cutters carried thereby and projecting from one face thereof, rotatable driving means connected to said head, a support for said driving means, and resilient means between said driving means and said support and tending to move said head bodily toward said support.

10. A tool for the purpose described, comprising, in combination with a shaft having a crank to provide for its rotation; a scraper head pivotally mounted at its middle and movable by the movement of said shaft; a bearing-head mounted upon the shaft; and means supported by the shaft and adapted to be directed longitudinally thereof for applying a resilient force for moving and tending to maintain a pressure upon the bearing-head in the direction of the scraper-blade.

11. In a tool for scraping the interior faces of boiler walls adjacent the hand hole openings thereof, the combination with a shaft adapted to pass axially through said opening, a transverse tool mounted upon the said shaft of such length as to span said opening, and resiliently mounted means carried by said shaft and bearing against the exterior boiler wall for drawing said tool into yielding engagement with the interior face of the boiler.

12. In a tool for scraping the interior faces of boiler walls adjacent the hand hole openings thereof, the combination with a shaft adapted to pass axially through said openings, a transverse tool mounted upon the said shaft of such length as to span said opening, and resiliently mounted means carried by said shaft and bearing against the exterior boiler wall for drawing said tool into yielding engagement with the interior face of the boiler, the mounting of said tool upon said shaft comprising a universal joint.

13. In a tool for scraping the interior faces of boiler walls adjacent the hand hole openings thereof, the combination with a shaft of a transverse tool, a universal joint connection between said shaft and the central portion of said tool and spring means carried by said shaft for forcibly drawing said tool toward the inner wall of the boiler.

Signed at New York city, in the county of New York and State of New York this 3rd day of March A. D. 1913.

AUGUST P. GERALD.

Witnesses:
CLAIR W. FAIRBANK,
FLORENCE LEVIEN.